US009609109B2

(12) United States Patent
Chen et al.

(10) Patent No.: US 9,609,109 B2
(45) Date of Patent: Mar. 28, 2017

(54) METHOD AND APPARATUS FOR DISPLAYING INCOMING CALL INFORMATION

(71) Applicant: Tencent Technology (Shenzhen) Company Limited, Shenzhen (CN)

(72) Inventors: Xiaobo Chen, Shenzhen (CN); Bin Li, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 21 days.

(21) Appl. No.: 14/734,958

(22) Filed: Jun. 9, 2015

(65) Prior Publication Data
US 2015/0296070 A1 Oct. 15, 2015

Related U.S. Application Data

(63) Continuation of application No. PCT/CN2013/084276, filed on Sep. 26, 2013.

(30) Foreign Application Priority Data

Dec. 12, 2012 (CN) .......................... 2012 1 0535394

(51) Int. Cl.
*H04M 1/725* (2006.01)
*H04M 3/42* (2006.01)
(Continued)

(52) U.S. Cl.
CPC ......... *H04M 1/72522* (2013.01); *H04M 1/57* (2013.01); *H04M 3/42042* (2013.01);
(Continued)

(58) Field of Classification Search
CPC .... H04M 1/57; H04M 1/575; H04M 1/72522; H04M 2201/38; H04M 3/04; H04M 3/42042
See application file for complete search history.

(56) References Cited

U.S. PATENT DOCUMENTS 6,868,283 B1* 3/2005 Bonansea ............. G06F 3/0481
455/550.1
2010/0323762 A1* 12/2010 Sindhu ................. G06F 1/1613
455/566

FOREIGN PATENT DOCUMENTS

| CN | 101102573 A | 1/2008 |
| CN | 101888429 A | 11/2010 |
| CN | 102387250 A | 3/2012 |

OTHER PUBLICATIONS

Tencent Technology, ISR, PCT/CN2013/084276, Jan. 2, 2014, 2pgs.
(Continued)

*Primary Examiner* — Erica Navar
(74) *Attorney, Agent, or Firm* — Morgan, Lewis & Bockius LLP

(57) ABSTRACT

The present disclosure discloses method and apparatus for displaying incoming call information. The method includes: generating a first trigger signal according to an incoming call received by a mobile terminal; in response to the first trigger signal, determining whether a current interface is an application interface and generating a determining result accordingly; intercepting data corresponding to a regular interface when the determining result is that the current interface of the mobile terminal is an application interface; generating a block interface according to the first trigger signal, the block interface comprising operation option and prompt information related to the incoming call; and displaying the block interface along with at least a portion of the current application interface.

18 Claims, 10 Drawing Sheets

(51) Int. Cl.
 *H04M 1/57* (2006.01)
 *H04M 3/04* (2006.01)
(52) U.S. Cl.
 CPC .............. *H04M 1/575* (2013.01); *H04M 3/04* (2013.01); *H04M 2201/38* (2013.01)

(56) References Cited

OTHER PUBLICATIONS

Tencent Technology, Written Opinion, PCT/CN2013/084276, Jan. 2, 2014, 9 pgs.
Tencent Technology, IPRP, PCT/CN2013/084276, Jun. 16, 2015, 5 pgs.

\* cited by examiner

METHOD AND APPARATUS FOR DISPLAYING INCOMING CALL INFORMATION

RELATED APPLICATIONS

This application is a continuation application of PCT Patent Application No. PCT/CN2013/084276, entitled "METHOD AND APPARATUS FOR DISPLAYING INCOMING CALL INFORMATION" filed on Sep. 26, 2013, which claims priority to Chinese Patent Application No. 2012105353941, entitled "METHOD AND APPARATUS FOR DISPLAYING INCOMING CALL INFORMATION", and filed with the Chinese Patent Office on Dec. 12, 2012, both of which are incorporated herein by reference in their entirety.

FIELD OF THE TECHNOLOGY

The present disclosure relates to the field of telephone application technologies, and in particular, to method and apparatus for displaying incoming call information.

BACKGROUND OF THE DISCLOSURE

When a conventional mobile terminal receives an incoming call, a full-screen incoming call interface generally pops up, where the incoming call interface displays information (such as a name and a portrait) of a caller and operation buttons (such as an answering button and a rejection button), as shown in FIG. 1, and a user can process the incoming call through the incoming call interface.

The conventional mobile terminal generally has multiple types of applications (such as a short message service application and a game application), and the user can send and receive a short message service message, play a game, or the like by using the mobile terminal.

In practice, the inventor finds that the existing technology has at least the following problem. When a user uses an application in a mobile terminal, if the mobile terminal receives an incoming call, the mobile terminal immediately displays in full screen mode an incoming call interface; as a result, the application being used by the user is interrupted, which is abrupt and intrusive to the user.

Therefore, a new technical solution needs to be put forward, so as to solve the foregoing technical problem.

SUMMARY

An aspect of the present disclosure is to provide a method performed at a mobile terminal for displaying incoming call information, which can display, in a user-friendly manner, an interface related to an incoming call when a mobile terminal receives the incoming call.

To solve the foregoing problem, technical solutions of embodiments of the present disclosure are as follows:

A method performed at a mobile terminal for displaying incoming call information includes: generating a first trigger signal according to an incoming call received by the mobile terminal; in response to the first trigger signal, determining whether a current interface of the mobile terminal is an application interface and generating a determining result accordingly; intercepting data corresponding to a regular interface when the determining result is that the current interface of the mobile terminal is an application interface, the regular interface being an interface, which is related to the incoming call, for replacing a home interface of the mobile terminal; generating a block interface according to the first trigger signal, the block interface comprising operation option information and prompt information that are related to the incoming call; and displaying the block interface along with at least a portion of the current application interface.

A mobile terminal includes one or more processors and memory storing a plurality of program modules, the plurality of program modules including instructions to be performed by the one or more processors for displaying incoming call information as described by the method above.

A non-transitory computer readable storage medium in connection with a mobile terminal includes one or more processors stores a plurality of program modules, the plurality of program modules including instructions to be performed by the one or more processors for displaying incoming call information as described by the method above.

Compared with the existing technology, in the present disclosure, data corresponding to a regular interface, which is related to displaying an incoming call, in the mobile terminal is intercepted when the incoming call is received, and a block interface relatively smaller than the regular interface is generated and displayed on a screen of the mobile terminal; therefore, a full-screen regular interface does not pop up in the mobile terminal when the mobile terminal receives the incoming call; on the contrary, because only a relatively small block interface is displayed, an application used by a user is not covered, which does not make the user feel abrupt or overwhelmed; even if the mobile terminal receives the incoming call, the user can still continue operating the application in the mobile terminal, and process the incoming call after a while; and in addition, the user can process the incoming call through the block interface.

To make the foregoing content of the present disclosure clearer and more comprehensible, preferred embodiments are described in detail below with reference to the accompanying drawings.

DESCRIPTION OF EMBODIMENTS

Descriptions of following embodiments are provided with reference to the accompanying drawings, and are used to exemplify specific embodiments that can be implemented by the present disclosure.

Terms "component", "module", "system", "interface" and the like generally refer to: hardware, combinations of hardware and software, software or executing software. For example, a component may be, but is not limited to, a process running in a processor, a processor, an object, an executable application, an executed thread, a program and/or a computer. According to the drawings, both an application running in a controller and the controller may be components. One or more components may exist in an executed process and/or thread, and the component may be located on one computer and/or distributed between two or more computers.

A term "computer readable storage medium" includes a non-transitory computer storage medium. The computer storage medium includes volatile and non-volatile, removable and non-removable mediums implemented by any method or technology and used for storing information such as computer readable instructions or other data. A memory is an instance of the computer storage medium. The computer storage medium includes, but is not limited to, a random access memory (RAM), a read-only memory (ROM), an electrically erasable programmable read-only memory (EEPROM), a flash memory, or other storage technologies; a compact disc ROM (CD-ROM), a digital versatile disc (DVD), or other optical storage apparatuses; a cassette tape, a magnetic tape, a magnetic disk storage apparatus, or other magnetic storage devices; or any other mediums that can be configured to store expected information and can be accessed by an apparatus/a system of the embodiments of the present application.

In the present disclosure, a subject required to be protected may be implemented by using standard programming and/or an engineering technology to produce software, firmware, hardware, or any other combination thereof, to control a computer to implement a method, an apparatus, or an article of manufacture of the disclosed subject. The term "article of manufacture" used in the specification is intended to encompass a computer program accessible from any computer readable device, carrier or medium. Certainly, a person skilled in the art may be aware that modifications may be performed on the configuration without departing from the scope and spirit of the subject required to be protected.

A method and an apparatus for displaying incoming call information according to the present disclosure are applicable to an operating system of a mobile terminal of Apple Inc., Google Inc., Microsoft Corporation, Nokia Investment Co., LTD, and the like.

Figure 3:
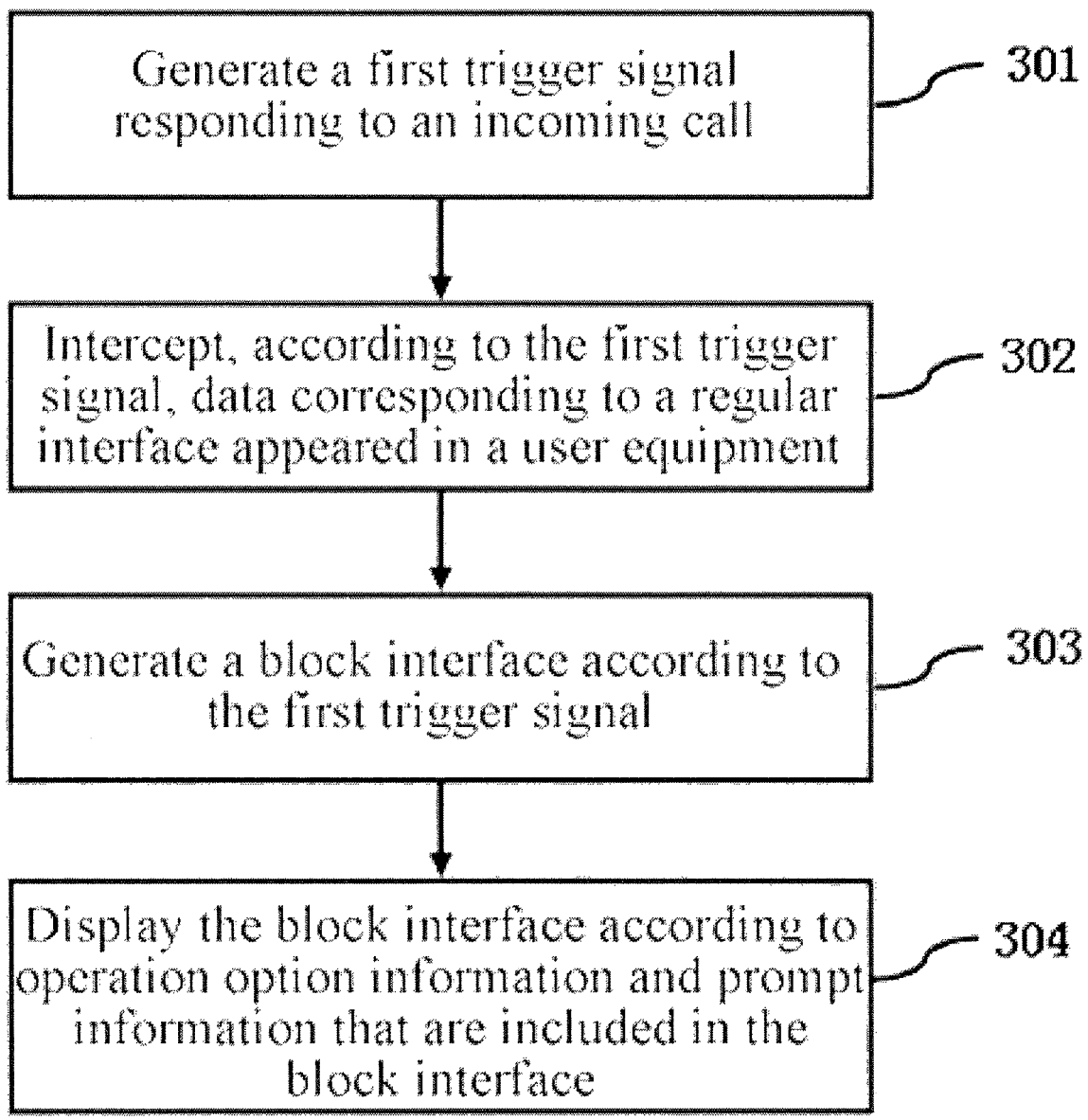
FIG. 3 is a flowchart of a first embodiment of a method for displaying incoming call information according to the present disclosure.

FIG. 3 is a flowchart of a first embodiment of a method for displaying incoming call information according to the present disclosure.

Step 301: Generate a first trigger signal according to an incoming call received by a mobile terminal. After the first trigger signal is generated, the first trigger signal is sent.

Step 302: Intercept, responsive to the first trigger signal, data corresponding to a regular interface appeared in the mobile terminal, where the regular interface is an interface, which is related to the incoming call, for replacing a home interface of the mobile terminal. Note that the home interface is the interface that does not correspond to a particular application interface. For example, the home interface may be the one that includes an array of application icons such that a user can invoke a particular application by selecting a corresponding application icon. A technical solution of intercepting the data corresponding to the regular interface may be: intercepting an incoming call interface display interface of an operating system of the mobile terminal, so as to ensure at the first time that the incoming call interface built in the system does not pop up on a screen of the mobile terminal. For different versions of operating systems, incoming call interface display interfaces of the systems may be different, which, in this case, can be found by performing hook (that is, a hook function in the field of computers) attempts for only several times.

Step 303: Generate a block interface according to the first trigger signal, where the block interface 201 includes operation option information and prompt information that are related to the incoming call.

Figure 2:
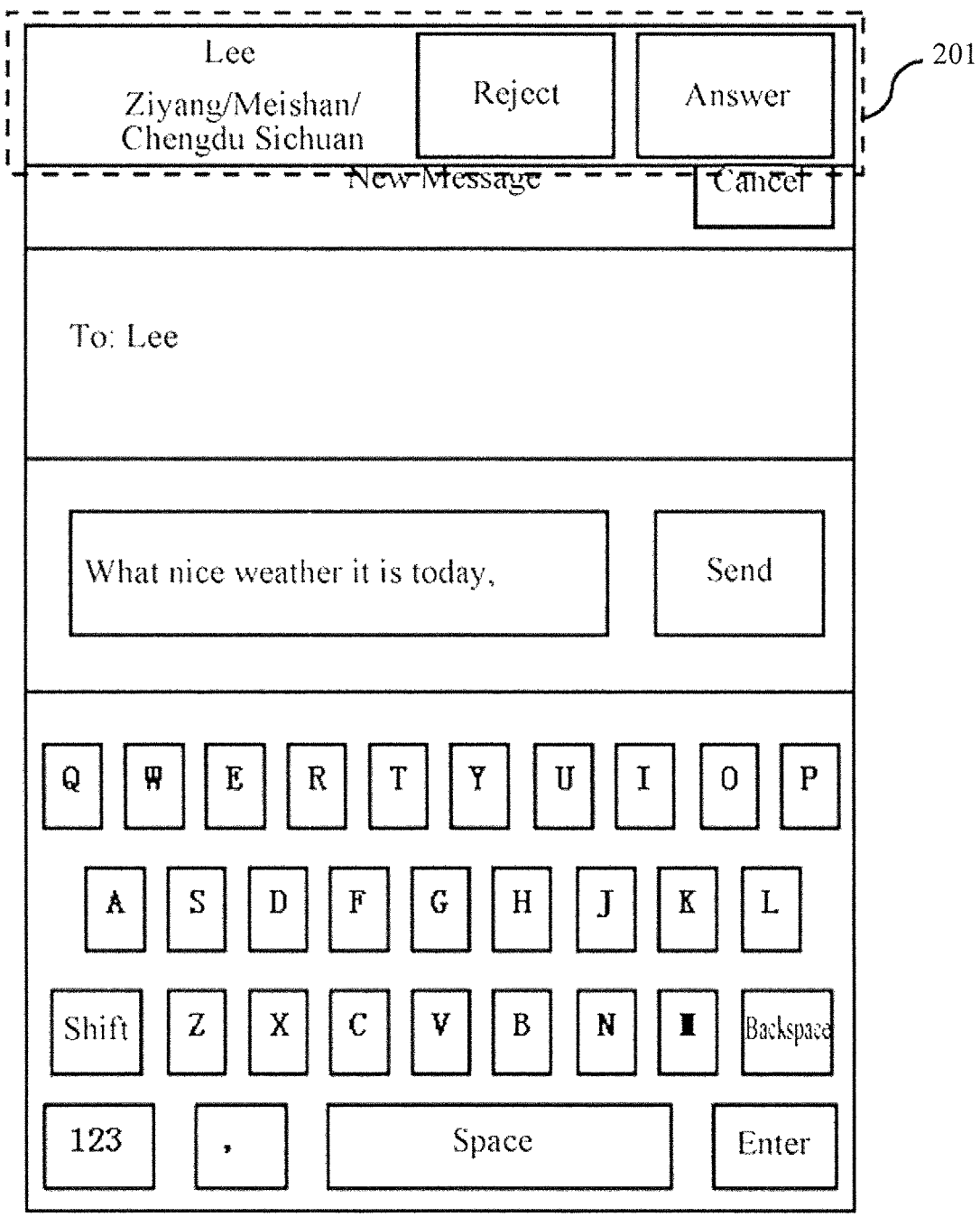
FIG. 2 is a schematic diagram of a block interface displayed after an incoming call is received according to the present disclosure.

Step 304: Display the block interface according to the operation option information and the prompt information that are included in the block interface. FIG. 2 is a schematic diagram of the block interface 201 displayed after an incoming call is received according to the present disclosure. In this embodiment, an area of the block interface 201 is relatively smaller than that of the regular interface.

In this embodiment, data corresponding to the regular interface, which is related to displaying the incoming call, in the mobile terminal is intercepted when the incoming call is received, and the block interface 201 relatively smaller than the regular interface is generated and displayed on the screen of the mobile terminal; therefore, a full-screen regular interface does not pop up in the mobile terminal when the mobile terminal receives the incoming call; on the contrary, because only a relatively small block interface 201 is displayed, an application used by a user is not covered, which does not make the user feel abrupt or overwhelmed; even if the mobile terminal receives the incoming call, the user can still continue operating the application in the mobile terminal, and process the incoming call after a while; and in addition, the user can process the incoming call through the block interface 201.

In this embodiment, regarding step 304, the block interface 201 may further be displayed close to an edge or the middle of the screen of the mobile terminal. For example, as shown in FIG. 2, the block interface 201 is displayed on a top edge of the screen of the mobile terminal. Regarding step 303, the block interface 201 may be, for example, rectangular. As a preferred example, the block interface 201 may be banner-shaped; and in addition, the block interface 201 may also be circular, triangular, rhombic, or the like.

Figure 4:
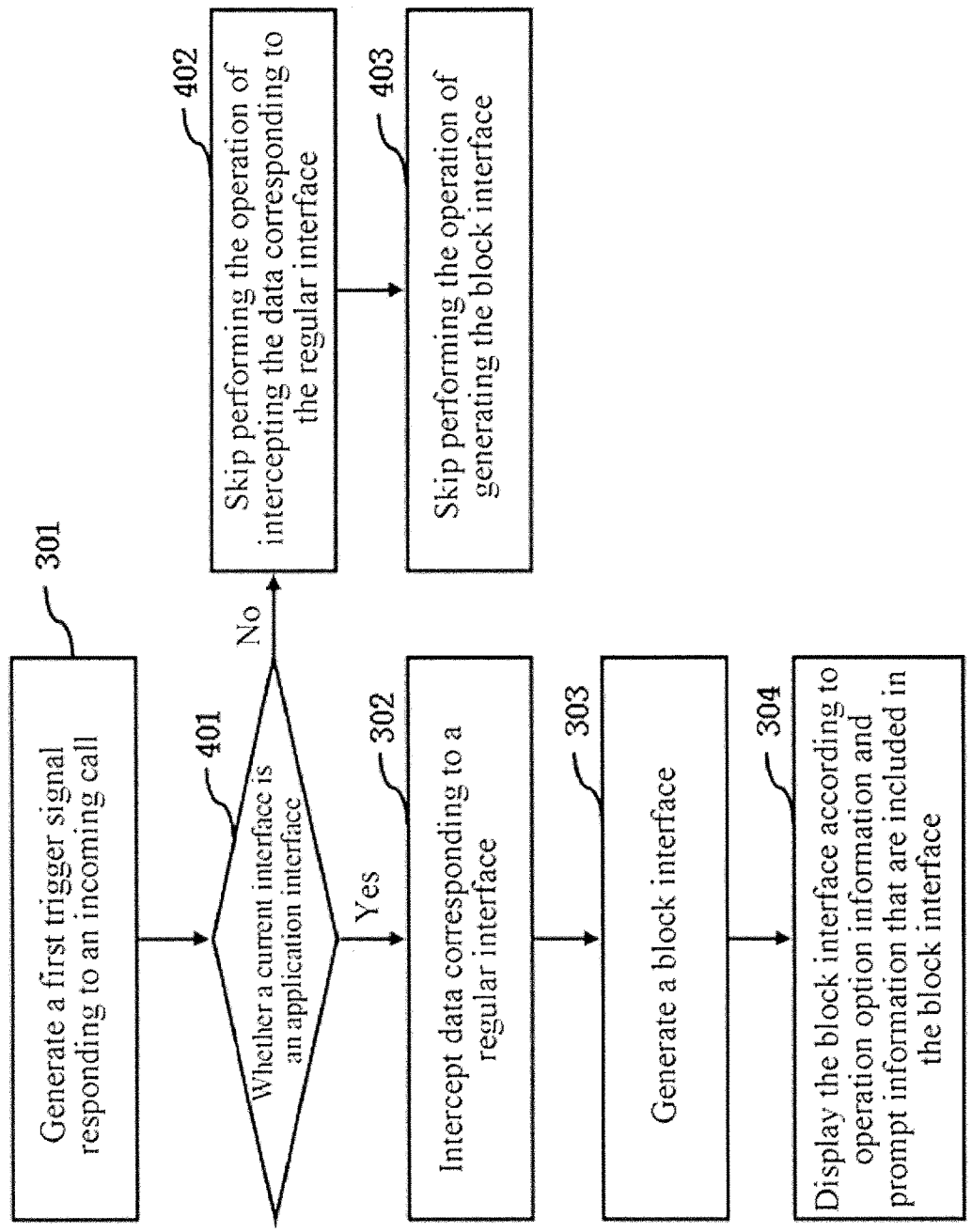
FIG. 4 is a flowchart of a second embodiment of a method for displaying incoming call information according to the present disclosure.

FIG. 4 is a flowchart of a second embodiment of a method for displaying incoming call information according to the present disclosure. This embodiment is similar to the foregoing first embodiment, and a difference lies in that: step 401 is performed after step 301.

Step 401: Receive the first trigger signal, and determine whether a current interface of the mobile terminal is an application interface (for example, the application interface may be an interface corresponding to any one of text input software, picture viewing software, web browser software, reading software, music playing software, and video playing software) and generate a determining result according to the first trigger signal. The determining result includes the following two cases: a first case is that the current interface of the mobile terminal is not an application interface; and a second case is that the current interface of the mobile terminal is an application interface.

When the determining result is that the current interface of the mobile terminal is an application interface, step 302 and step 303 are performed, that is, in step 302, the data corresponding to the regular interface is intercepted, and in step 303, the block interface 201 is generated.

Figure 1:
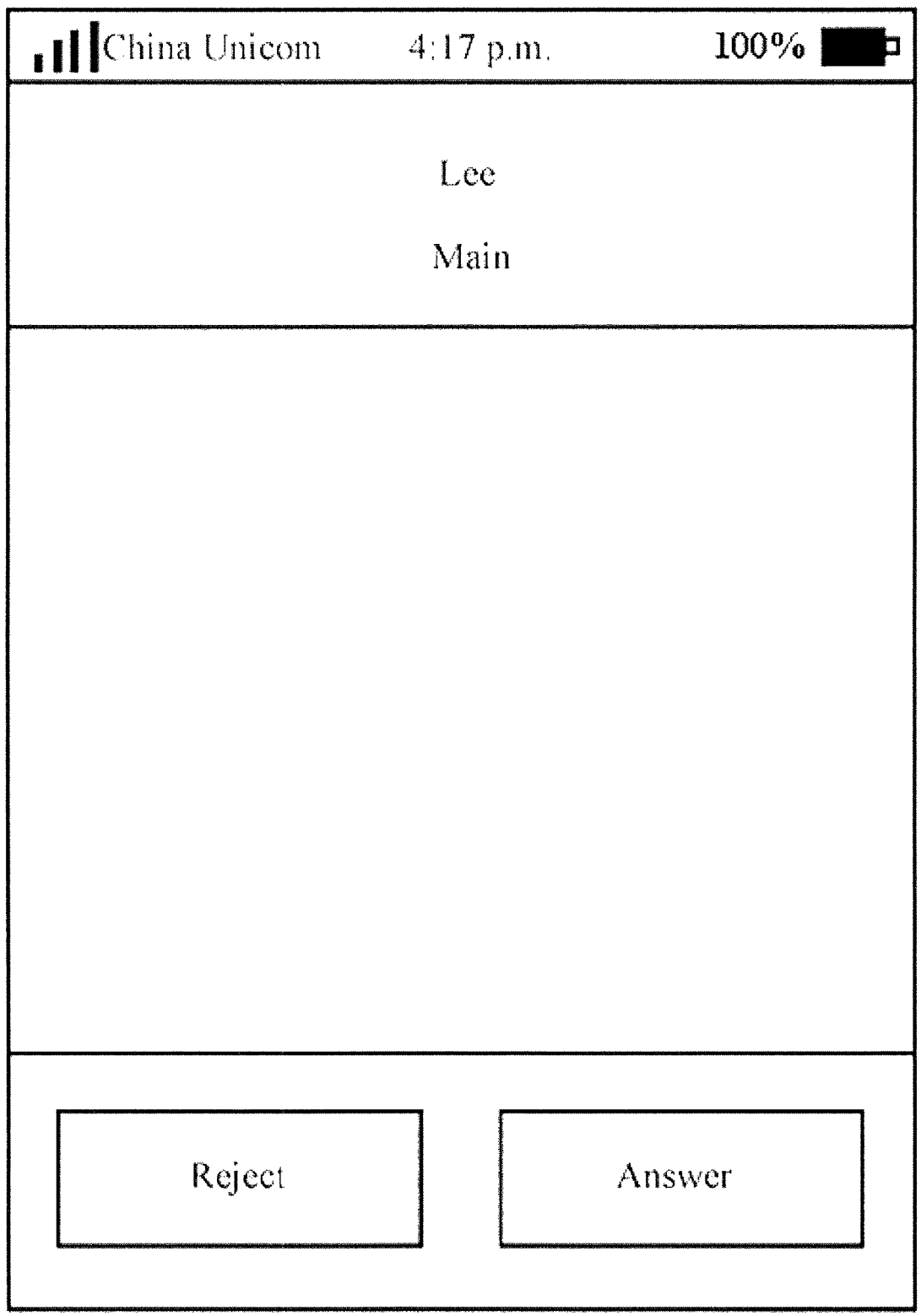
FIG. 1 is a schematic diagram of a regular interface displayed after a mobile terminal receives an incoming call in the existing technology.

When the determining result is that the current interface of the mobile terminal is not an application interface (e.g., the current interface is a home interface), step 402 and step 403 are performed, that is, in step 402, the operation of intercepting the data corresponding to the regular interface is not performed, and in step 403, the operation of generating the block interface 201 is not performed. For example, the mobile terminal may display the regular interface as shown in FIG. 1.

Because the operation of determining whether the current interface of the mobile terminal is an application interface is performed, the operation of whether to intercept the regular interface and the operation of whether to display the block interface are selectively performed according to the responded determining result, which helps to intercept the regular interface and display the block interface only when the regular interface needs to be intercepted and the block interface needs to be displayed. In this way, when the regular interface does not need to be intercepted and the block interface does not need to be displayed, the regular interface is not intercepted and the block interface is not displayed, thereby reducing a data processing volume of the mobile terminal, and reducing unnecessary resource consumption of a central processing unit (CPU).

Figure 5:
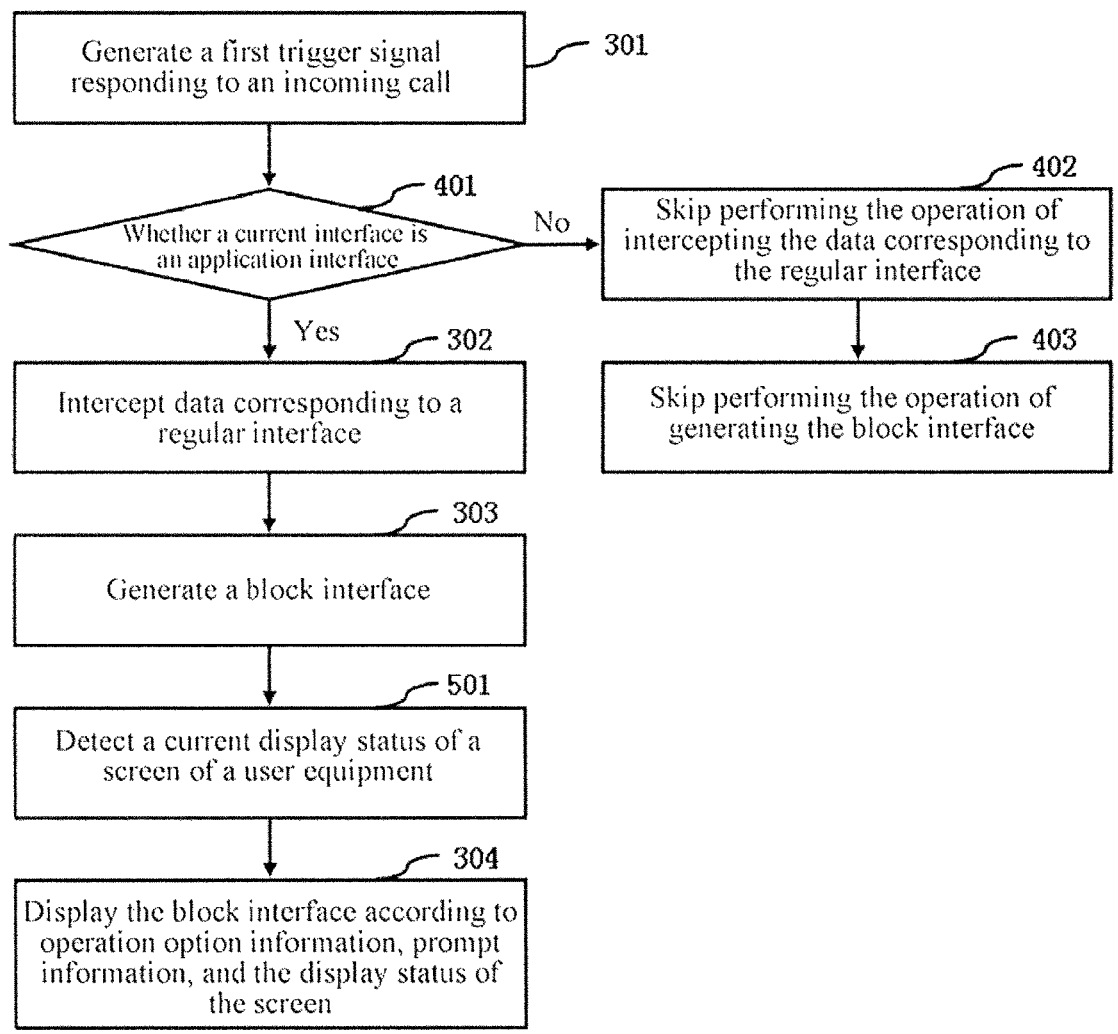
FIG. 5 is a flowchart of a third embodiment of a method for displaying incoming call information according to the present disclosure.

FIG. 5 is a flowchart of a third embodiment of a method for displaying incoming call information according to the present disclosure. This embodiment is similar to the foregoing first or second embodiment, and a difference lies in that: step 501, that is, detect a current display status of a screen of the mobile terminal, is performed before or during step 304 is performed, where the display status of the screen includes a portrait screen state or a landscape screen state.

Step 304: Display the block interface according to the current display status of the screen.

For example, as shown in FIG. 2, the display status of the screen of the mobile terminal is the landscape screen state; and regarding step 304, the block interface 201 is displayed according to the width of the screen of the mobile terminal in the landscape screen state.

In this embodiment, because the display status of the screen of the mobile terminal is detected, and the block interface 201 is displayed according to the current display status of the screen of the mobile terminal, a case in which the display status of the screen of the mobile terminal changes can be adapted to, which helps to intercept the regular interface in the mobile terminal and display the block interface in different display statuses of the screen.

Figure 6:
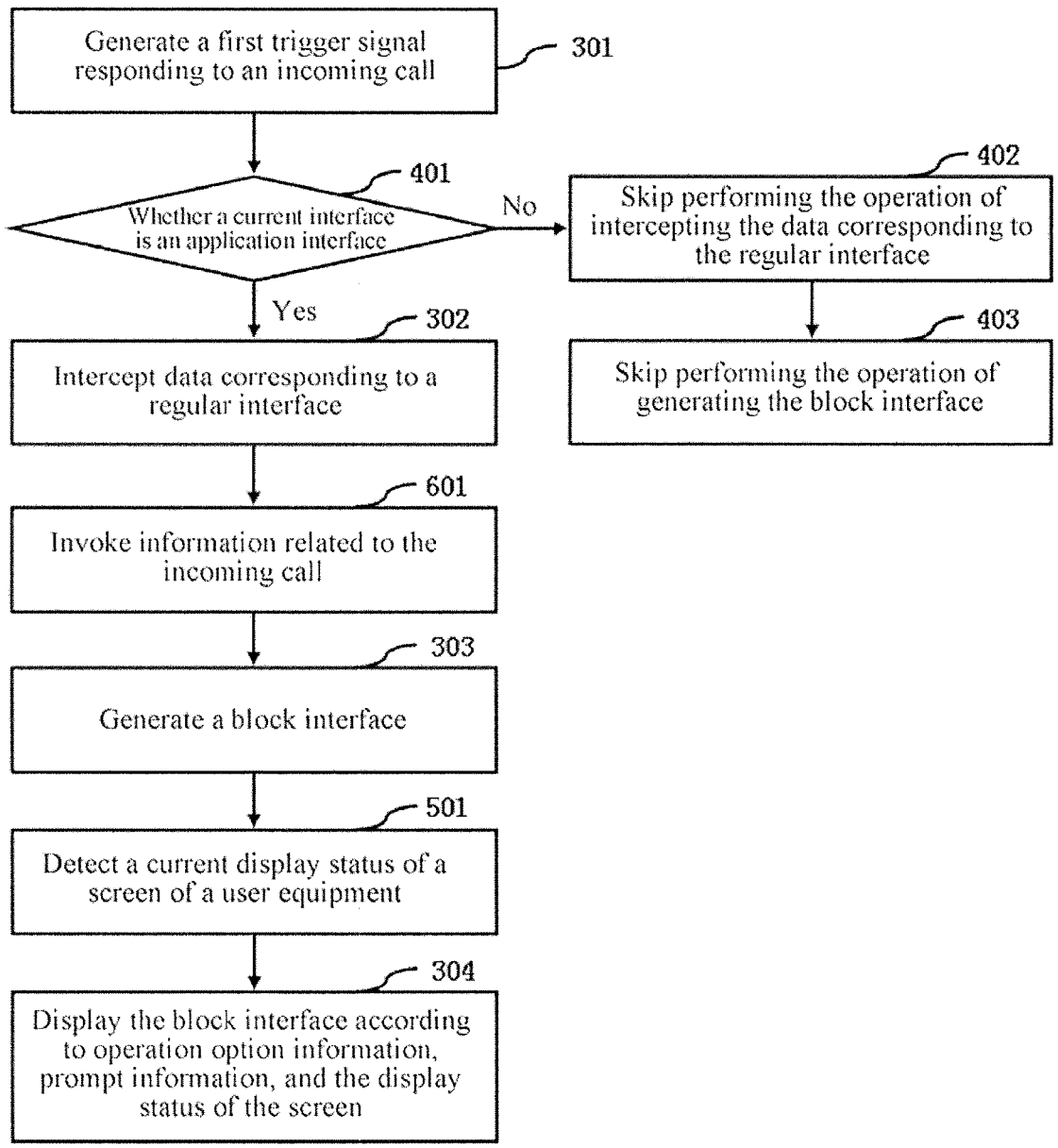
FIG. 6 is a flowchart of a fourth embodiment of a method for displaying incoming call information according to the present disclosure.

FIG. 6 is a flowchart of a fourth embodiment of a method for displaying incoming call information according to the present disclosure. This embodiment is similar to any one of the foregoing first, second, and third embodiments, and a difference lies in that: step 601, that is, invoke the information related to the incoming call, is performed before step 303.

The information related to the incoming call may include a portrait, a name, a home location of a number, or the like of a caller.

After the information related to the incoming call is invoked, the information is sent.

Regarding step 303, the block interface 201 is generated according to the information of the incoming call.

In this embodiment, because the information related to the incoming call is invoked, and the block interface 201 is generated according to the information, the block interface 201 has information related to the caller, which helps a user to implement, in the block interface 201, an operation related to the incoming call.

Figure 7:
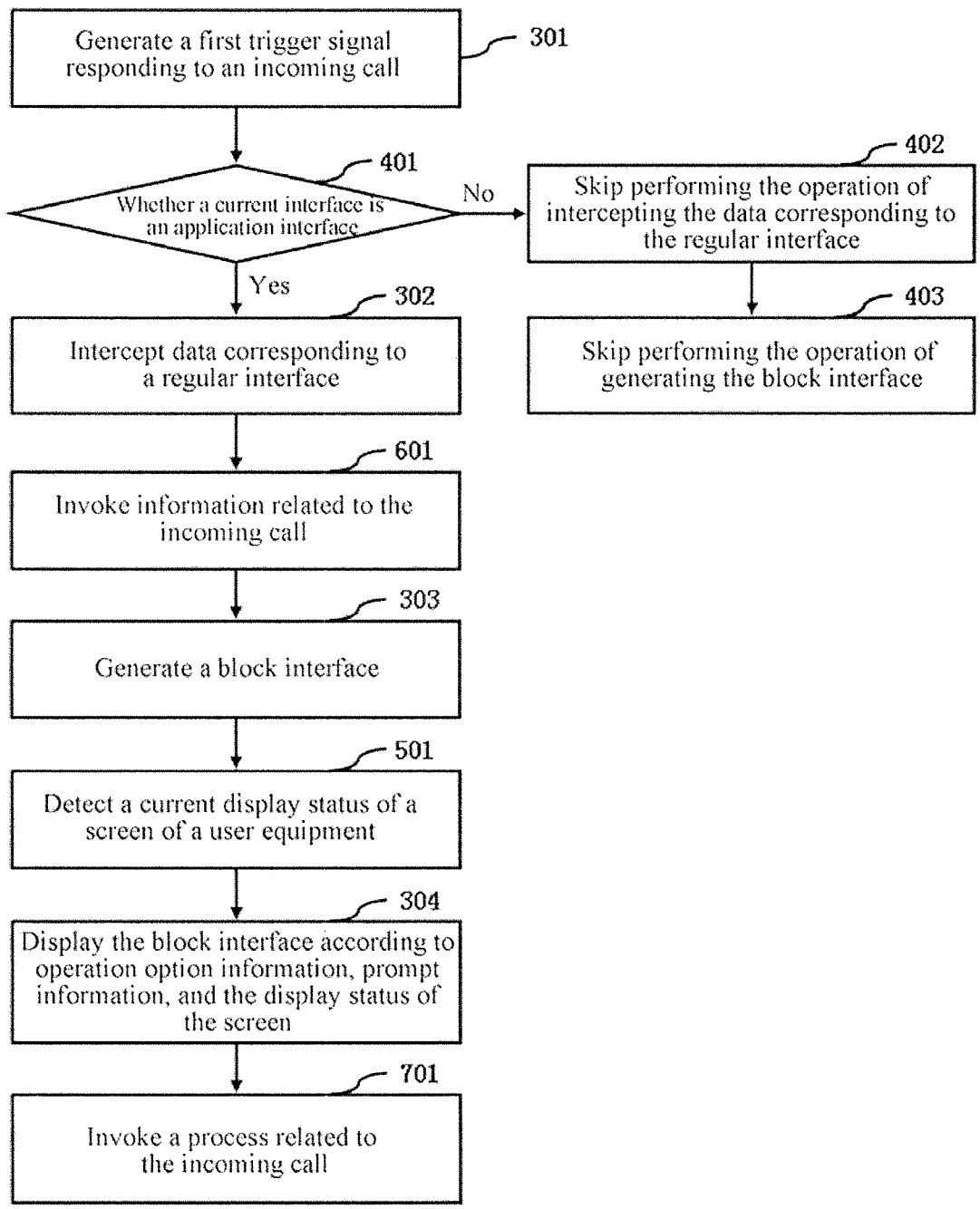
FIG. 7 is a flowchart of a fifth embodiment of a method for displaying incoming call information according to the present disclosure.

FIG. 7 is a flowchart of a fifth embodiment of a method for displaying incoming call information according to the present disclosure. This embodiment is similar to any one of the foregoing first, second, third, and fourth embodiments, and a difference lies in that: a first process (a process, which is related to the incoming call, in the mobile terminal) is invoked before, after, or during step 304 is performed. In some embodiments, the first process is used for generating the data corresponding to the regular interface and/or the data corresponding to the block interface such that the mobile terminal can render one of the two interfaces based on the determination result.

For example, after the incoming call is received, an alarm/a vibration interface in the mobile terminal is invoked, and a related alarm/vibration process is started; or, after the incoming call is received, a screen display interface in the mobile terminal is invoked, and a screen of the mobile terminal is controlled to remain luminous before the block interface 201 disappears.

In this embodiment, because the screen display interface in the mobile terminal is invoked, the screen of the mobile terminal remains luminous before the block interface 201 disappears, which helps to avoid that the screen turns dark or display of the screen is canceled when a user needs to operate a button in the block interface, thereby further avoiding that the user cannot perform an operation on a corresponding incoming call.

In addition, if a very important application is currently being run by the user, an abrupt interruption to the application may even lead to data loss and cause an unpredictable consequence. Therefore, in this embodiment, it may further be determined whether an application corresponding to the application interface is related to a process such as an audio playing process, a video playing process, or a game; if yes, a process, which is related to suspending the application, in the mobile terminal is invoked (a process that corresponds to the application is suspended after the user chooses to answer the incoming call), or an operation of suspending the process is performed by the user (an option or a button for suspending the process that corresponds to the application is provided for the user, so that the user freely chooses whether to suspend the process that corresponds to the application); after the incoming call is ended, a process related to continuing with the application is invoked (the process corresponding to the application continues to be performed after the user chooses to end the incoming call), or an operation of continuing to perform the process is performed by the user (an option or a button for continuing to perform the process that corresponds to the application is provided for the user, so that the user freely chooses whether to continue to perform the process that corresponds to the application).

Because when the application corresponding to the application interface in the mobile terminal is a process such as an audio playing process, a video playing process, or a game, the process, which is related to suspending the application, in the mobile terminal is invoked to suspend the corresponding application, data loss can be prevented.

The following steps may further be included in any one of the foregoing first, second, third, fourth, and fifth embodiments: detecting whether the incoming call is ended; generating a second trigger signal responding to a state in which the incoming call is ended when the incoming call is ended (that is, the call is ended); and terminating displaying the block interface along with at least a portion of the current application interface 201 according to the second trigger signal.

The following steps may further be included in any one of the foregoing first, second, third, fourth, and fifth embodiments: determining whether the application interface is a telephone call interface and generating a second determining result when the first determining result is that a current interface state of the mobile terminal corresponds to the application interface; intercepting the data corresponding to the regular interface and generating a banner interface when the second determining result is that the application interface is not a telephone call interface; skipping performing the operation of intercepting the data corresponding to the regular interface and the operation of generating the banner interface when the second determining result is that the application interface is a telephone call interface.

Because the regular interface is not intercepted and the block interface is not displayed when the regular interface does not need to be intercepted and the block interface does not need to be displayed, a data processing volume of the mobile terminal can be reduced, and unnecessary resource consumption of a CPU can be reduced.

Figure 8:
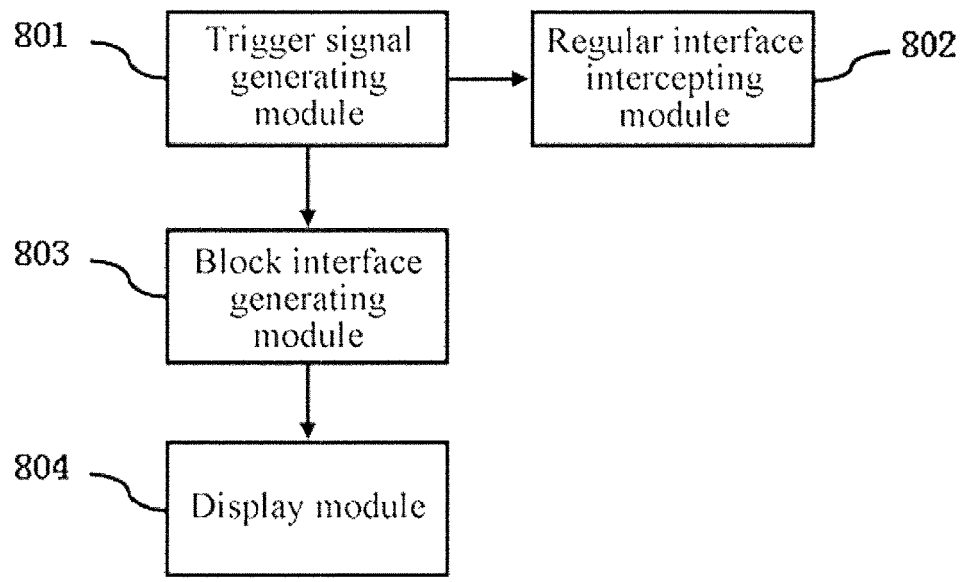
FIG. 8 is a block diagram of a first embodiment of an apparatus for displaying incoming call information according to the present disclosure.

FIG. 8 is a block diagram of a first embodiment of a mobile terminal for displaying incoming call information according to the present disclosure.

The apparatus for displaying incoming call information of this embodiment includes one or more processors, memory, and a plurality of program modules stored in the memory and to be executed by the one or more processors, the plurality of program modules including a trigger signal generating module 801, a regular interface intercepting module 802, a block interface generating module 803, and a display module 804.

The trigger signal generating module 801 is configured to generate a first trigger signal according to an incoming call received by a mobile terminal. After generating the first trigger signal, the trigger signal generating module 801 sends the first trigger signal to the regular interface intercepting module 802 and the block interface generating module 803.

The regular interface intercepting module 802 is configured to intercept, according to the first trigger signal, data corresponding to a regular interface of the mobile terminal, where the regular interface is an interface, which is related to the incoming call, for replacing a home interface of the mobile terminal. A technical solution of intercepting the data corresponding to the regular interface may be: intercepting, by the regular interface intercepting module 802, an incoming call interface display interface of an operating system of the mobile terminal, so as to ensure at the first time that the incoming call interface built in the system does not pop up on a screen of the mobile terminal. For different versions of operating systems, incoming call interface display interfaces of the systems may be different, which, in this case, can be found by the regular interface intercepting module 802 by performing hook (that is, a hook function in the field of computers) attempts for only several times.

The block interface generating module 803 is configured to generate a block interface 201 according to the first trigger signal, where the block interface 201 includes operation option information and prompt information that are related to the incoming call. In this embodiment, an area of the block interface 201 is relatively smaller than that of the regular interface.

The display module 804 is configured to display the block interface 201 according to the operation option and the prompt information that are included in the block interface 201.

In this embodiment, data corresponding to the regular interface, which is related to displaying the incoming call, in the mobile terminal is intercepted when the incoming call is received, and the block interface 201 relatively smaller than the regular interface is generated and displayed on a screen of the mobile terminal; therefore, a full-screen regular interface does not pop up in the mobile terminal when the mobile terminal receives the incoming call; on the contrary, because only a relatively small block interface 201 is displayed, an application used by a user is not covered, which does not make the user feel abrupt or overwhelmed; even if the mobile terminal receives the incoming call, the user can still continue operating the application in the mobile terminal, and process the incoming call after a while; and in addition, the user can process the incoming call through the block interface 201.

In this embodiment, the display module 804 is further configured to display the block interface 201 close an edge or the middle of the screen of the mobile terminal. For example, as shown in FIG. 2, the block interface 201 is displayed on a top edge of the screen of the mobile terminal. The block interface 201 may be generated (constructed) to be rectangular by the block interface generating module 803. As a preferred example, the block interface 201 may be generated to be banner-shaped by the block interface generating module 803; and in addition, the block interface 201 may also be generated to be circular, triangular, rhombic, or the like by the block interface generating module 803.

Figure 9:
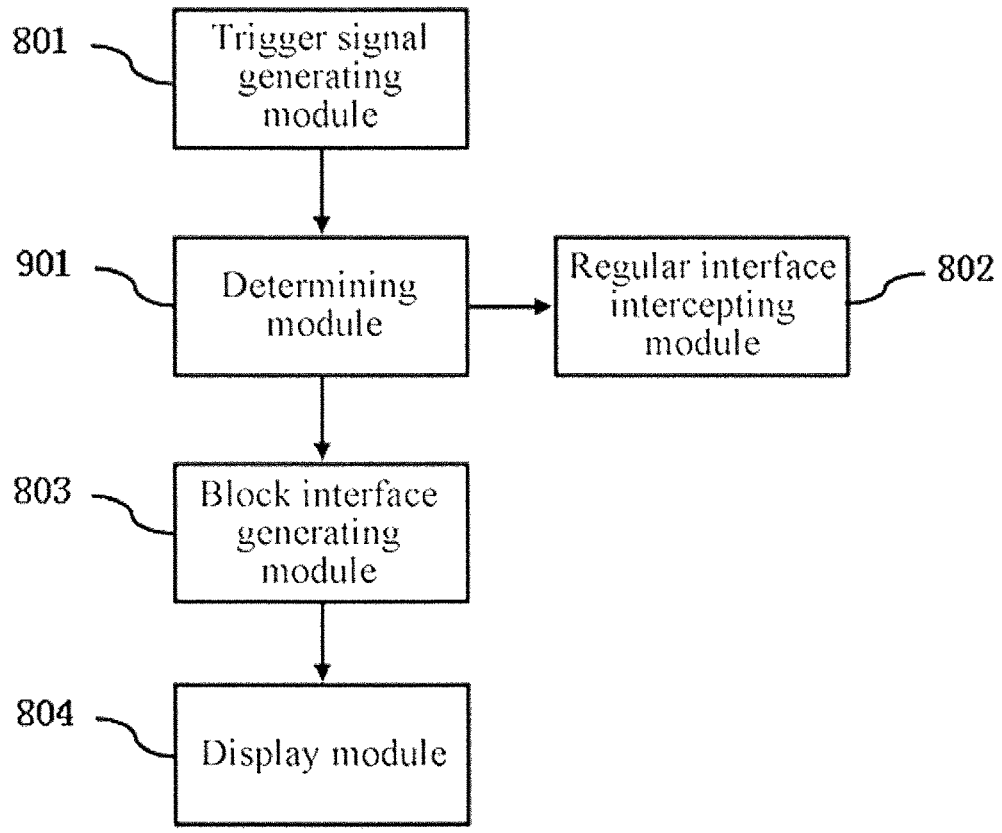
FIG. 9 is a block diagram of a second embodiment of an apparatus for displaying incoming call information according to the present disclosure.

FIG. 9 is a block diagram of a second embodiment of an apparatus for displaying incoming call information according to the present disclosure. This embodiment is similar to the foregoing first embodiment, and a difference lies in that: the apparatus for displaying incoming call information of this embodiment further includes a determining module 901.

The determining module 901 is configured to determine whether a current interface of the mobile terminal is an application interface (for example, the application interface may be an interface corresponding to any one of text input software, picture viewing software, browser software, reading software, music playing software, and video playing software) and generate a determining result according to the first trigger signal. The determining result is sent to the regular interface intercepting module 802 and the block interface generating module 803 by the determining module 901.

When the determining result is that the current interface of the mobile terminal is an application interface, the regular interface intercepting module 802 is configured to intercept data corresponding to the regular interface, and the block interface generating module 803 is configured to generate the block interface 201.

When the determining result is that the current interface of the mobile terminal is not an application interface, the regular interface intercepting module 802 does not perform the operation of intercepting the data corresponding to the regular interface, and the block interface generating module 803 does not perform the operation of generating the block interface 201.

Because the operation of determining whether the current interface of the mobile terminal is an application interface is performed, the operation of whether to intercept the regular interface and the operation of whether to display the block interface are selectively performed according to the responded determining result, which helps to intercept the regular interface and display the block interface only when the regular interface needs to be intercepted and the block interface needs to be displayed. In this way, when the regular interface does not need to be intercepted and the block interface does not need to be displayed, the regular interface is not intercepted and the block interface is not displayed, thereby reducing a data processing volume of the mobile terminal, and reducing unnecessary resource consumption of a CPU.

Figure 10:
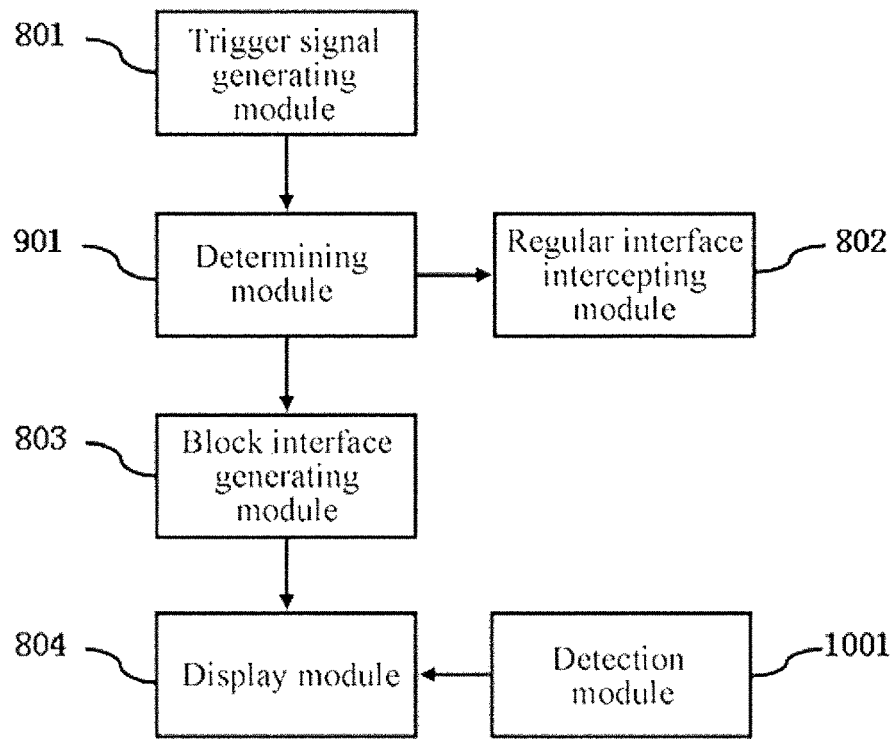
FIG. 10 is a block diagram of a third embodiment of an apparatus for displaying incoming call information according to the present disclosure.

FIG. 10 is a block diagram of a third embodiment of an apparatus for displaying incoming call information according to the present disclosure. This embodiment is similar to the foregoing first or second embodiment, and a difference lies in that: the apparatus for displaying incoming call information of this embodiment further includes a detection module 1001.

The detection module 1001 is configured to detect a current display status of a screen of the mobile terminal, where the display status of the screen includes a portrait screen state or a landscape screen state.

The display module 804 is further configured to display the block interface 201 according to the current display status of the screen.

For example, as shown in FIG. 2, the display status of the screen of the mobile terminal is the landscape screen state, and the display module 804 displays the block interface 201 according to the width of the screen of the mobile terminal in the landscape screen state.

In this embodiment, because the display status of the screen of the mobile terminal is detected, and the block interface 201 is displayed according to the current display status of the screen of the mobile terminal, a case in which the display status of the screen of the mobile terminal changes can be adapted to, which helps to intercept the regular interface of in mobile terminal and display the block interface in different display statuses of the screen.

Figure 11:
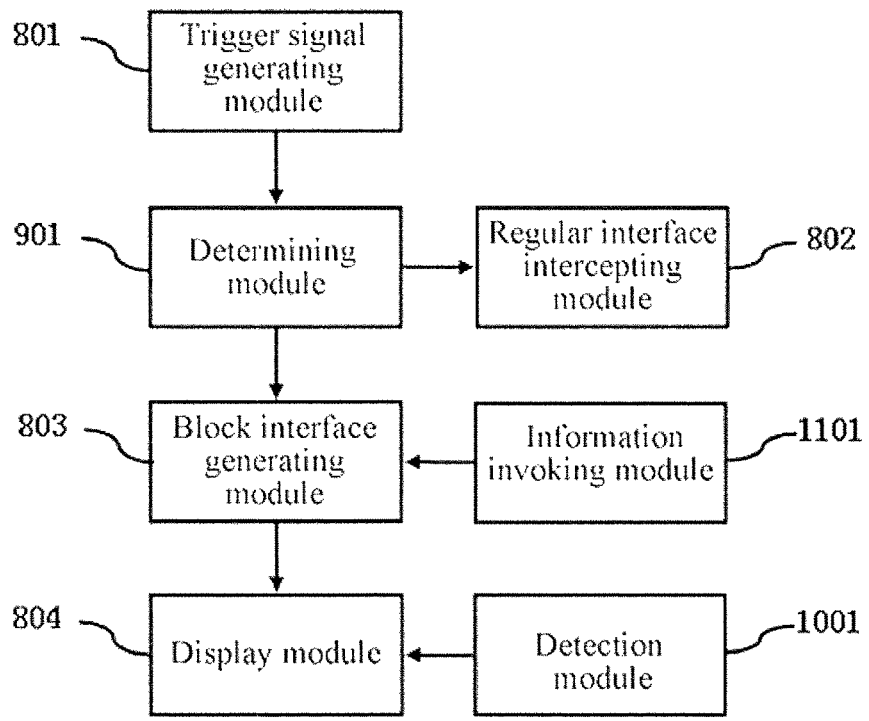
FIG. 11 is a block diagram of a fourth embodiment of an apparatus for displaying incoming call information according to the present disclosure.

FIG. 11 is a block diagram of a fourth embodiment of an apparatus for displaying incoming call information according to the present disclosure. This embodiment is similar to any one of the foregoing first, second, and third embodiments, and a difference lies in that: the apparatus for displaying incoming call information of this embodiment further includes an information invoking module 1101.

The information invoking module 1101 is configured to invoke the information related to the incoming call.

The information related to the incoming call may include a portrait, a name, a home location of a number, or the like of a caller.

The information invoking module 1101 is further configured to send the information to a block interface generating module 803 after invoking the information related to the incoming call.

The block interface generating module 803 is further configured to generate the block interface 201 according to the information related to the incoming call.

In this embodiment, because the information related to the incoming call is invoked by using the information invoking module 1101, and the block interface 201 is generated according to the information, the block interface 201 has information related to the caller, which helps a user to implement, in the block interface 201, an operation related to the incoming call.

Figure 12:
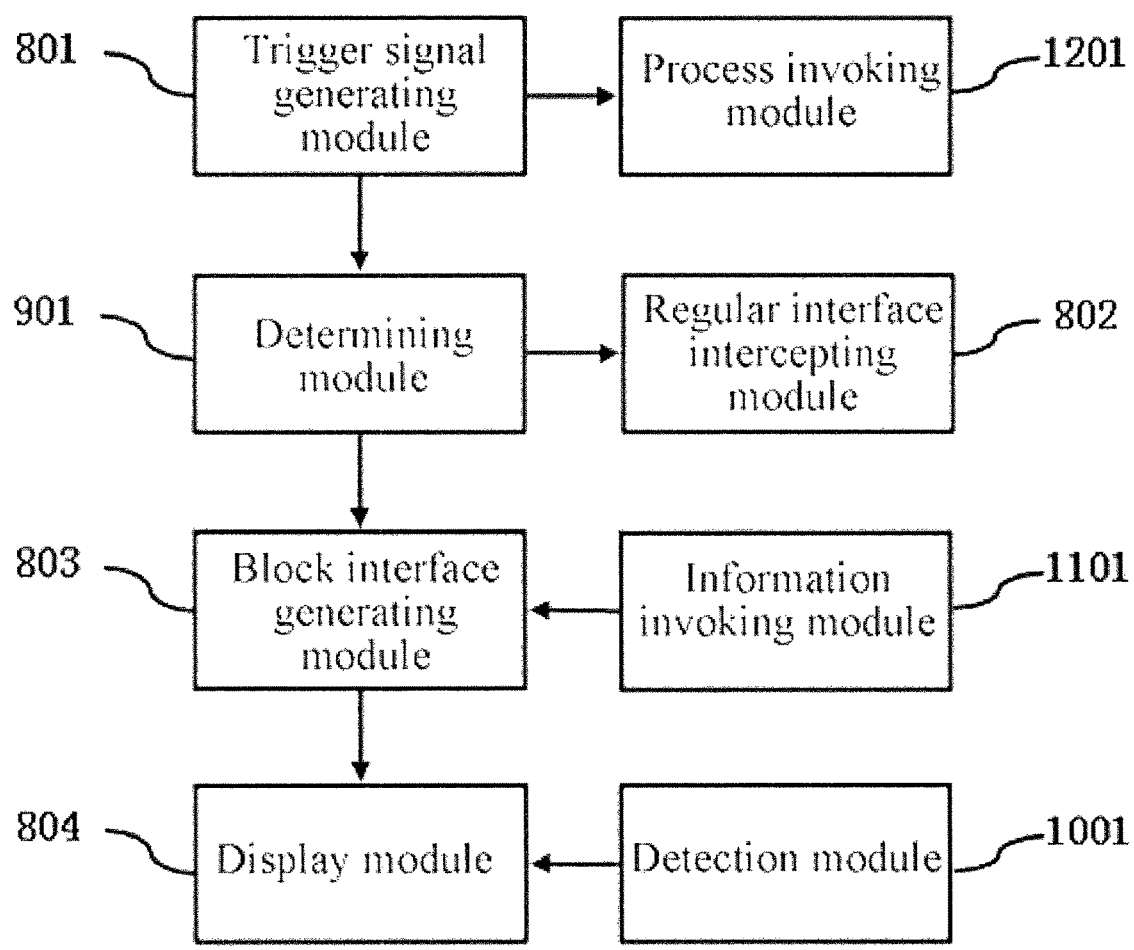
FIG. 12 is a block diagram of a fifth embodiment of an apparatus for displaying incoming call information according to the present disclosure.

FIG. 12 is a block diagram of a fifth embodiment of an apparatus for displaying incoming call information according to the present disclosure.

This embodiment is similar to any one of the foregoing first, second, third, and fourth embodiments, and a difference lies in that: the apparatus for displaying incoming call information of this embodiment further includes a process invoking module 1201.

The process invoking module 1201 is configured to receive a first trigger signal from the trigger signal generating module 801 and invoke a first process (a process, which is related to the incoming call, in the mobile terminal) after receiving the first trigger signal.

For example, the process invoking module 1201 may be configured to invoke an alarm/a vibration interface in the mobile terminal after receiving the first trigger signal, and configured to start a related alarm/vibration process; and the process invoking module 1201 may also be configured to invoke a screen display interface in the mobile terminal after receiving the first trigger signal, and configured to control a screen of the mobile terminal to remain luminous before the block interface 201 disappears.

In this embodiment, because the screen display interface in the mobile terminal is invoked, the screen of the mobile terminal remains luminous before the block interface 201 disappears, which helps to avoid that the screen turns dark or display of the screen is canceled when a user needs to operate a button in the block interface, thereby further avoiding that the user cannot perform an operation on a corresponding incoming call.

In addition, in this embodiment, if a very important application is currently being run by the user, an abrupt interruption to the application may even lead to data loss and cause an unpredictable consequence. Therefore, a determining module 901 may further be configured to determine whether an application corresponding to an application interface is related to a process such as an audio playing process, a video playing process, or a game; if yes, the process invoking module 1201 may further be configured to invoke a process, which is related to suspending the application, in the mobile terminal after receiving the first trigger signal (a process that corresponds to the application is suspended after the user chooses to answer the incoming call), or an operation of suspending the process is performed by the user (an option or a button for suspending the process that corresponds to the application is provided for the user, so that the user freely chooses whether to suspend the process that corresponds to the application); the process invoking module 1201 may further be configured to invoke, after the incoming call is ended, a process related to continuing with the application (the process corresponding to the application continues to be performed after the user chooses to end the incoming call), or an operation of continuing to perform the process is performed by the user (an option or a button for continuing to perform the process that corresponds to the application is provided for the user, so that the user freely chooses whether to continue to perform the process that corresponds to the application).

Because when the application corresponding to the application interface in the mobile terminal is a process such as an audio playing process, a video playing process, or a game, the process, which is related to suspending the application, in the mobile terminal is invoked to suspend the application, data loss can be prevented.

In any one of the foregoing first, second, third, fourth, and fifth embodiments, the trigger signal generating module 801 is further configured to detect whether the incoming call is ended, and generate a second trigger signal responding to a state in which the incoming call is ended when the incoming call is ended (that is, the call is ended); and the display module 804 is further configured to terminate displaying the block interface along with at least a portion of the current application interface 201 according to the second trigger signal.

In any one of the foregoing first, second, third, fourth, and fifth embodiments, when the first determining result is that a current interface state of the mobile terminal corresponds to the application interface, the determining module 901 is further configured to determine whether the application interface is a telephone call interface and generate a second determining result; when the second determining result is that the application interface is not a telephone call interface, the regular interface intercepting module 802 is configured to intercept the regular interface, and the block interface generating module 803 is configured to generate a banner interface; and when the second determining result is that the application interface is a telephone call interface, the regular interface intercepting module 802 is configured to skip performing the operation of intercepting the regular interface, and the block interface generating module 803 is configured to skip performing the operation of generating the banner interface.

Because the regular interface is not intercepted and the block interface is not displayed when the regular interface does not need to be intercepted and the block interface does not need to be displayed, a data processing volume of the mobile terminal can be reduced, and unnecessary resource consumption of a CPU can be reduced.

A non-transitory computer readable storage medium of an embodiment of the present application stores a computer program. The computer program is used to perform the foregoing method for displaying incoming call information, that is, the computer program is an instruction program used to perform a function for displaying incoming call information and may be performed by a computer, where the function includes all or some steps, for example, step 301 to step 304, of the foregoing method for displaying incoming call information.

Although the present disclosure is shown and described by using one or more implementation manners, a person skilled in the art may conceive equivalent variations and modifications based on reading and understanding of the specification and the accompanying drawings. The present disclosure includes all such variations and modifications, which is only limited by the scope of the appended claims. In particular regard to the various functions performed by the foregoing components (such as elements and resources), terms used to describe such components are intended to correspond to any component (unless indicated otherwise) performing specified functions of the components (for example, the components are equivalent in functions), even if structures of the functions are not equivalent to the disclosed structures of functions in the exemplary implementation manners in the specification shown in the specification. In addition, although specific features of the specification are disclosed with respect to only one of several implementation manners, the features may be combined with one or more other features of other implementation manners that are desirable for and advantageous to a given or specific application. Moreover, for the terms "include", "have", "contain" or variations thereof being used in specific implementation manners or claims, such terms are intended to be inclusive in a same manner to that of a term "comprise".

To sum up, the present application are disclosed above through the preferred embodiments; however, the preferred embodiments are not intended to limit the present disclosure; and a person of ordinary skill in the art can make various modifications and improvements without departing from the spirit and scope of the present disclosure, and therefore, the protection scope of the present disclosure should be subject to the scope defined by the claims.

What is claimed is:

1. A method for displaying incoming call information, comprising:
    at a mobile terminal having one or more processors and memory storing program modules to be executed by the one or more processors:
    generating a first trigger signal according to an incoming call received by the mobile terminal;
    in response to the first trigger signal, determining whether a current interface of the mobile terminal is an application interface and generating a determining result accordingly;
    intercepting data corresponding to a regular interface when the determining result is that the current interface of the mobile terminal is an application interface, the regular interface being an interface, which is related to the incoming call, for replacing a home interface of the mobile terminal;
    determining whether the application interface is associated with an application of a predetermined type;
    in accordance with a determination that the application interface is associated with an application of the predetermined type:
    generating a block interface according to the first trigger signal, the block interface comprising operation option information and prompt information that are related to the incoming call;
    displaying the block interface along with at least a portion of the current application interface;
    providing a user input option which prompts the user to choose to suspend a respective application associated with the application interface; and
    suspending the application in response to a user selection of the user input option; and
    in accordance with a determination that the application interface is not associated with an application of the predetermined type:
    forgoing performing the operations corresponding to the block interface, the provision of the user input option, and the suspension of the application.

2. The method according to claim 1, wherein, after the step of displaying the block interface, the method further comprising:
    generating a second trigger signal according to a call ending command received by the mobile terminal; and
    terminating displaying the block interface while keeping the current application interface in response to the second trigger signal.

3. The method according to claim 1, wherein, after the step of generating the first trigger signal, and before the step of generating the block interface, the method further comprising:
collecting information of a caller of the incoming call, wherein
the step of generating the block interface comprises:
generating the block interface according to the information of the caller.

4. The method according to claim 1, wherein, after the step of generating the first trigger signal, and before the step of displaying the block interface along with at least a portion of the current application interface, the method further comprising:
detecting a current display status of a screen of the mobile terminal, the display status of the screen comprising a portrait screen state or a landscape screen state, wherein
the step of displaying the block interface along with at least a portion of the current application interface comprises:
displaying the block interface along with at least a portion of the current application interface according to the current display status of the screen.

5. The method according to claim 4, wherein the block interface is displayed close to an edge or the middle of the screen of the mobile terminal.

6. The method according to claim 1, wherein, after the step of generating the first trigger signal, the method further comprising:
invoking a first process according to the first trigger signal, wherein
the first process is related to invoking an alarm/vibration interface or activating a luminous screen display while displaying the block interface according to the incoming call.

7. A mobile terminal, comprising:
one or more processors;
memory; and
a plurality of programs stored in the memory, which, when executed by the one or more processors, cause the mobile terminal to perform predefined operations, the plurality of programs including instructions for:
generating a first trigger signal according to an incoming call received by the mobile terminal; in response to the first trigger signal, determining whether a current interface of the mobile terminal is an application interface and generating a determining result accordingly; intercepting data corresponding to a regular interface when the determining result is that the current interface of the mobile terminal is an application interface, the regular interface being an interface, which is related to the incoming call, for replacing a home interface of the mobile terminal; determining whether the application interface is associated with an application of a predetermined type;
in accordance with a determination that the application interface is associated with an application of the predetermined type:
generating a block interface according to the first trigger signal, the block interface comprising operation option information and prompt information that are related to the incoming call;
displaying the block interface along with at least a portion of the current application interface;
providing a user input option which prompts the user to choose to suspend a respective application associated with the application interface; and
suspending the application in response to a user selection of the user input option; and
in accordance with a determination that the application interface is not associated with an application of the predetermined type:
forgoing performing the operations corresponding to the block interface, the provision of the user input option, and the suspension of the application.

8. The mobile terminal according to claim 7, wherein the plurality of programs further include instructions for:
collecting information of a caller of the incoming call, wherein generating the block interface further comprises:
generating the block interface according to the information of the caller.

9. The mobile terminal according to claim 7, wherein the plurality of programs further include instructions for:
detecting a current display status of a screen of the mobile terminal, the display status of the screen comprising a portrait screen state or a landscape screen state, wherein
displaying the block interface along with at least a portion of the current application interface further comprises:
displaying the block interface along with at least a portion of the current application interface according to the current display status of the screen.

10. The mobile terminal according to claim 9, wherein the block interface is displayed close to an edge or the middle of the screen of the mobile terminal.

11. The mobile terminal according to claim 7, wherein the plurality of programs further include instructions for:
invoking a first process according to the first trigger signal, wherein
the first process is related to invoking an alarm/vibration interface or activating a luminous screen display while displaying the block interface according to the incoming call.

12. The mobile terminal according to claim 7, wherein the plurality of programs further include instructions for:
generating a second trigger signal according to a call ending command received by the mobile terminal; and
terminating displaying the block interface while keeping the current application interface in response to the second trigger signal.

13. A non-transitory computer readable storage medium storing a plurality of instructions, which, when executed by a mobile terminal, cause the mobile terminal to:
generate a first trigger signal according to an incoming call received by the mobile terminal;
in response to the first trigger signal, determine whether a current interface of the mobile terminal is an application interface and generate a determining result accordingly;
intercept data corresponding to a regular interface when the determining result is that the current interface of the mobile terminal is an application interface, the regular interface being an interface, which is related to the incoming call, for replacing a home interface of the mobile terminal;
determine whether the application interface is associated with an application of a predetermined type;
in accordance with a determination that the application interface is associated with an application of the predetermined type:

generate a block interface according to the first trigger signal, the block interface comprising operation option information and prompt information that are related to the incoming call;

display the block interface along with at least a portion of the current application interface;

provide a user input option which prompts the user to choose to suspend a respective application associated with the application interface; and suspend the application in response to a user selection of the user input option; and in accordance with a determination that the application interface is not associated with an application of the predetermined type:

forgoing performing the operations corresponding to the block interface, the provision of the user input option, and the suspension of the application.

14. The non-transitory computer readable storage medium according to claim 13, wherein the plurality of instructions further cause the mobile terminal to:

collect information of a caller of the incoming call; and generate the block interface according to the information of the caller.

15. The non-transitory computer readable storage medium according to claim 13, wherein the plurality of instructions further cause the mobile terminal to:

detect a current display status of a screen of the mobile terminal, the display status of the screen comprising a portrait screen state or a landscape screen state; and display the block interface along with at least a portion of the current application interface according to the current display status of the screen.

16. The non-transitory computer readable storage medium according to claim 15, wherein the block interface is displayed close to an edge or the middle of the screen of the mobile terminal.

17. The non-transitory computer readable storage medium according to claim 13, wherein the plurality of instructions further cause the mobile terminal to:

invoke a first process according to the first trigger signal, wherein the first process is related to invoking an alarm/vibration interface or activating a luminous screen display while displaying the block interface according to the incoming call.

18. The non-transitory computer readable storage medium according to claim 13, wherein the plurality of instructions further cause the mobile terminal to:

generate a second trigger signal according to a call ending command received by the mobile terminal; and terminate displaying the block interface while keeping the current application interface in response to the second trigger signal.

\* \* \* \* \*